United States Patent
Livshits et al.

(10) Patent No.: US 12,549,353 B2
(45) Date of Patent: Feb. 10, 2026

(54) SYSTEMS AND METHODS FOR IN ORDER CROSS CLUSTER REPLICATION OF ENCRYPTED MESSAGES

(71) Applicant: RingCentral, Inc., Belmont, CA (US)

(72) Inventors: David Livshits, Modiin-Maccabim-Reut (IL); Lev Rosenblit, Shoham (IL); Yossi Alufer, Holon (IL); Dmitrii Bukreev, Petah Tikva (IL)

(73) Assignee: RingCentral, Inc., Belmont, CA (US)

( * ) Notice: Subject to any disclaimer, the term of this patent is extended or adjusted under 35 U.S.C. 154(b) by 109 days.

(21) Appl. No.: 18/390,655

(22) Filed: Dec. 20, 2023

(65) Prior Publication Data

US 2025/0211436 A1 Jun. 26, 2025

(51) Int. Cl.
*H04L 9/08* (2006.01)

(52) U.S. Cl.
CPC .................. *H04L 9/088* (2013.01)

(58) Field of Classification Search
CPC ...... G06F 9/546; G06F 9/542; G06F 16/2365; G06F 16/27; G06F 2209/548; H04L 47/34; H04L 67/12; H04L 51/226; H04L 67/06; H04L 67/62
See application file for complete search history.

(56) References Cited

U.S. PATENT DOCUMENTS

| | | | |
|---|---|---|---|
| 9,929,743 B1 * | 3/2018 | Acuña-Rohter | H03M 7/30 |
| 10,432,558 B2 | 10/2019 | Castellucci et al. | |
| 11,500,703 B1 * | 11/2022 | Wei | G06F 9/546 |
| 2018/0067864 A1 * | 3/2018 | Park | G01R 22/063 |
| 2020/0034929 A1 * | 1/2020 | Rao | H04L 47/562 |

* cited by examiner

*Primary Examiner* — Olugbenga O Idowu
(74) *Attorney, Agent, or Firm* — Ansari Katiraei LLP; Arman Katiraei

(57) ABSTRACT

A multi-cluster environment improves the availability and performance of encryption messaging services by providing an in-order cross cluster replication of encryption messages. A first cluster and a second cluster of the multi-cluster environment receive messages with a session identifier for an encrypted session. The first and second clusters replicate the received messages across the multi-cluster environment. A third cluster of the multi-cluster environment detects a particular message from the replicated messages with a timestamp that is earlier than a timestamp of the other replicated messages, and defines a message sequence window with a subset of messages from the replicated messages arranged in an order that differs from an ordering with which the third cluster receives the replicated messages. The third cluster distributes the reordered subset of messages to endpoints of the encrypted session connected via the third cluster.

20 Claims, 7 Drawing Sheets

SYSTEMS AND METHODS FOR IN ORDER CROSS CLUSTER REPLICATION OF ENCRYPTED MESSAGES

TECHNICAL FIELD

The present disclosure relates to the field of data privacy and encryption. More specifically, the present disclosure relates to message encryption and/or encrypted sessions involving clients that participate in the encrypted sessions using a multi-cluster environment.

BACKGROUND

An encrypted messaging protocol may provide end-to-end encryption for messages exchanged between clients participating in an encrypted session. The messages exchanged over the encrypted session may include emails, text messages, Short Message Service ("SMS") communications, chat messages, direct messages, multimedia packets encoded with audio and/or video data, system messages, control message, or the like.

The encrypted messaging protocol performs an exchange of encryption keys and/or other cipher metadata between the clients to ensure that each client may encrypt and decrypt messages to and from any client of in the encrypted session. Since the encrypted session may include tens, hundreds, or even more clients, the exchange of encryption keys and/or other cipher metadata must occur in an orderly fashion so that the clients apply the correct encryption keys to decrypt messages from other clients.

The encrypted messaging protocol is typically implemented in a single cluster environment. For instance, the encryption key and cipher metadata exchange occurs and/or is managed within the single cluster environment. The single cluster environment may include one server or node for responding to the requests to add or remove clients from the encrypted session and for updating their encryption keys in the order that the requests arrive.

Some clients may be remote to the server or the single cluster environment, and may experience high latency in joining the encrypted session, receiving updated encryption or cipher information for other clients, and/or exchanging encrypted messaging with the other clients. Moreover, the single cluster environment has a single point of failure. If the single cluster environment experiences a failure (e.g., network, hardware, software, or other failure) or becomes temporarily unavailable for any period of time, the encrypted messaging for all clients of the encrypted session becomes disabled and inoperative. Accordingly, there is a need to scale the encryption establishment, management, and messaging for each encrypted session across multiple clusters for high availability of the encrypted messaging service and for improved performance for distributed clients.

DETAILED DESCRIPTION OF PREFERRED EMBODIMENTS

Figure 1:
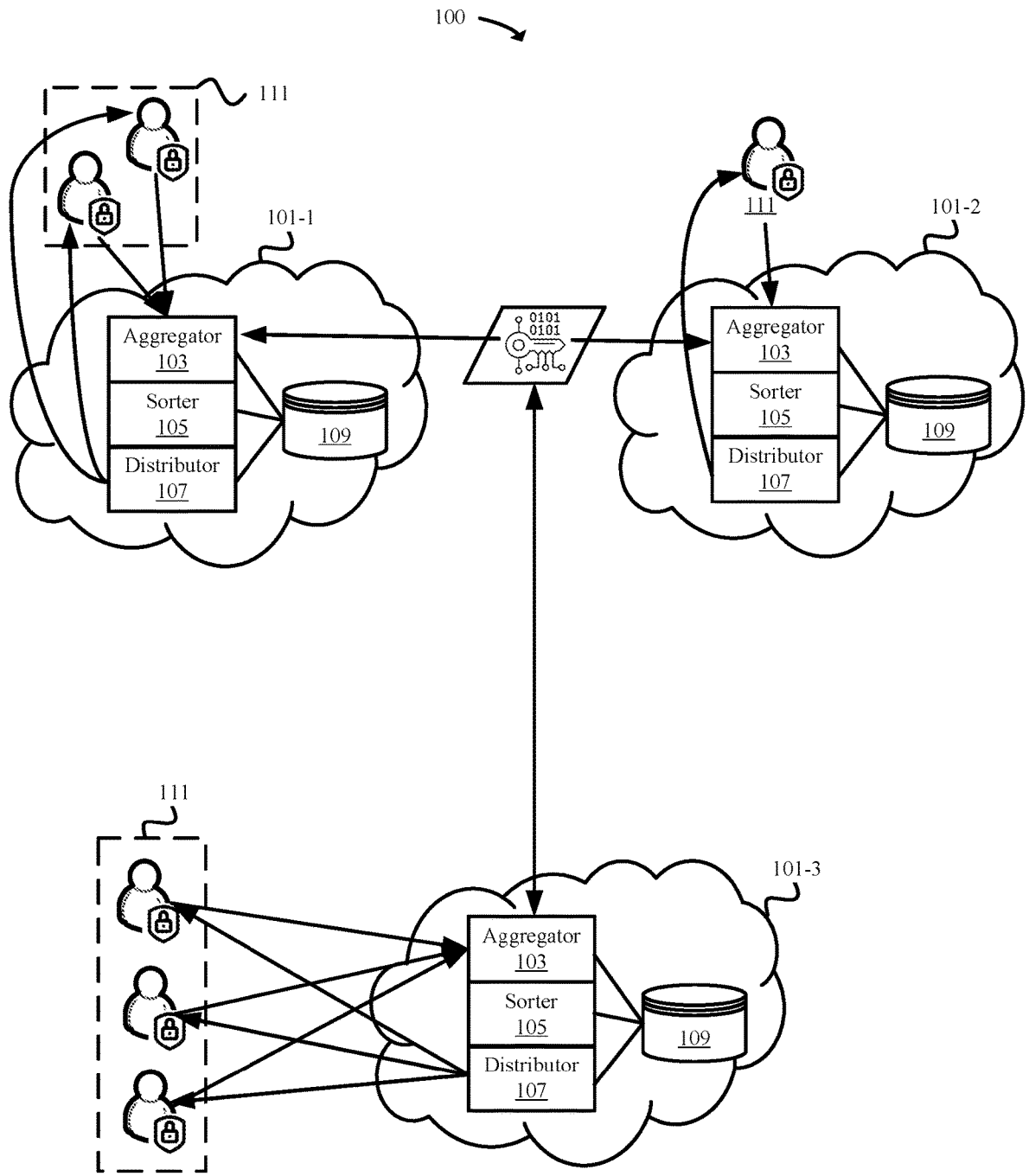
FIG. 1 illustrates an example multi-cluster environment for improving the availability and performance of an encrypted messaging service and/or an encryption protocol in accordance with some embodiments presented herein.

This disclosure arises from the realization that end-to-end encryption services implemented in a single cluster environment are subject to a single point of failure that can disable messaging or encryption services for each and every encrypted endpoint of different encrypted sessions or groups. Moreover, the single cluster environment may provide disproportionate performance to the encrypted endpoints based on their proximity to the single cluster.

The current disclosure provides a technological solution to the technological problem of data privacy and encryption. The technological solution improves the availability and performance of end-to-end encryption messaging and/or communication services. Specifically, the technological solution provides a multi-cluster environment through which clients may receive encryption keys and/or other cipher metadata for joining, messaging, and/or communicating with other clients of an encrypted session via any operating cluster of the multi-cluster environment. If any cluster of the multi-cluster environment fails or otherwise becomes unavailable, the remaining operational clusters may manage the encrypted key exchange, and clients that joined the encrypted session via the failing cluster may rejoin the encrypted session and receive the encrypted messages being exchanged in the encrypted session via the remaining operational clusters. In addition to the improved availability, the technological solution improves performance by providing the different clusters in different regions so that clients distributed across those different regions experience less latency in joining an encrypted session (e.g., performing the encryption key and/or other cipher metadata exchange) and/or securely participating in the encrypted session by exchanging encrypted messaging with other encrypted session clients.

The technological solution is adapted to work in conjunction with various encryption protocols, encrypted sessions, and/or end-to-end encrypted services. An encryption protocol or end-to-end encrypted service is one that ensures that only the authorized members in a conversation or group, and no intermediate servers, routers, devices, or relay systems, can read and write messages for that conversation or group. Encrypted sessions may include any form of encrypted communication between two or more endpoints. For instance, the encrypted sessions may include encrypted messaging services (e.g., encrypted instance messaging, encrypted text messaging, encrypted group chats, etc.), encrypted voice services (e.g., encrypted end-to-end calling), and/or encrypted conferencing solutions (e.g., encrypted video communications, encrypted presentations, etc.), and/or encrypted broadcasts or content. Accordingly, the multi-cluster environment may be adapted to enhance the availability and performance of various continuous group key agreement protocols, such as the Messaging Layer Security ("MLS") protocol, and/or other encryption or Secure Group Messaging ("SGM") protocols. In other words, the technological solution is agnostic of the underlying encryption protocol that is used to securely exchange encryption keys and/or other cipher metadata between clients and/or that is used to perform the encryption and decryption of the messages. As such, the technological solution may be used to facilitate the secure exchange of different messages or message types including emails, text messages, Short Message Service ("SMS") communications, chat messages, direct messages, multimedia packets encoded with audio and/or video data, system messages, control message, or the like across the multi-cluster environment.

FIG. 1 illustrates an example multi-cluster environment 100 for improving the availability and performance of an encrypted messaging service and/or an encryption protocol in accordance with some embodiments presented herein. Multi-cluster environment 100 includes two or more clusters through which any client may join an encrypted session, receive encryption keys and/or other cipher data for encrypting and decrypting messages or communications with any other client of the encrypted session, and/or exchange the encrypted messages or communications (e.g., encrypt and decrypt data packets with any encrypted session member). As shown in FIG. 1, multi-cluster environment 100 includes first cluster 101-1, second cluster 101-2, and third cluster 101-3 (hereinafter collectively referred to as "clusters 101" or individually referred to as "cluster 101"). Multi-cluster environment 100 may be scaled to include one fewer or many more clusters 101.

Clusters 101 represent different network points-of-presence or network nodes that are distributed to different regions. Clients 111 may communicate with or exchange data with clusters 101 over a data network in order to access encrypted services that run within or are hosted by multi-cluster environment 100. For instance, authentication services and delivery services of the MLS protocol may run from each cluster 101, thereby providing clients 111 distributed network nodes by which clients 111 establish MLS encrypted groups and exchange end-to-end encrypted messages with other members of an encrypted group. Clusters 101 support other encrypted protocols and sessions including encrypting messaging, chat, voice, conferencing, and/or other services.

Clusters 101 may be predefined or preconfigured to replicate data of the one or more underlying or supported encryption protocols, and perform a synchronized and/or ordered distribution of the replicated data to client devices 111. Each cluster 101 has one or more specialized servers or devices with processor, memory, storage, network, and/or other hardware resources that implement message aggregator 103, sorter 105, distributor 107, and data store 109 of that cluster 101.

Message aggregator 103 receives data, packets, or messages of the one or more underlying or supported encryption protocols from clients 111 that access an encrypted messaging service via that message aggregator 103 cluster 101. Message aggregator 103 also replicates and distributes received client 111 data, packets, or messages with message aggregators 103 in other clusters 101.

Clients 111 access an encrypted messaging service or other encryption services via multi-cluster environment 100 to become an encrypted endpoint in an end-to-end encrypted session or encrypted group. As an encrypted endpoint, client 111 may exchange encrypted data with other encrypted endpoints of the same end-to-end encrypted session or encrypted group without intervening devices or nodes (e.g., clusters 101) being able to decrypt or otherwise access the encrypted data. Accordingly, clients 111 include user devices that encrypt and decrypt the encrypted session data based on the encryption keys and/or cipher data exchanged with other clients 111 through multi-cluster environment 100 and an underlying or supported encryption protocol.

The messages received by message aggregators 103 may include the encryption protocol handshakes and/or other protocol procedures for securely adding, removing, and updating clients 111 of an encrypted session, exchanging encryption keys and/or other cipher data for encrypting and decrypting data between the encrypted session members, and/or exchanging the encrypted packets amongst the encrypted session members. More specifically, the messages may include MLS messages for establishing two or more clients 111 as encrypted endpoints of an encrypted session and for securing the communications between the encrypted endpoints of the encrypted session.

Message sorter 105 orders the received messages (e.g., messages received from clients 111 and from message aggregators 103 of other clusters 101). The message ordering ensures that a sequence of messages, whether for exchanging encryption keys and/or cipher metadata between two or more clients 111 or for adding and removing encrypted endpoints of an encrypted session, remains in order even when those messages are replicated across clusters 101 and arrive out-of-order at a receiving cluster 101 because of network latency or other factors related to the message replication. For instance, the MLS protocol has a specific procedure with which clients 111 may be added to an encrypted session. The procedure includes providing encryption keys of an added client 111 to the other session members. If multiple clients 111 are added at the same time and the encryption keys or other encrypted endpoint establishment messages for the different clients 111 arrive out-of-order, then clients 111 may associate the incorrect encryption keys to the added clients 111 and the establishment procedure may fail.

As another example, a first client 111 in an encrypted session may send a message to remove a second client 111 from the encrypted session, and a third client 111 in the encrypted session may send an encrypted data message to all members of the encrypted session. The first client 111 may access the encrypted messaging service via first cluster 101, the second client 111 may access the encrypted messaging service via second cluster 101-2, and the third client 111 may access the encrypted messaging service via third cluster 101-3. Due to network latency, the encrypted data message from the third cluster 101-3 may arrive at second cluster 101-2 before the removal message, and may result in the second client 111 improperly receiving and decrypting the encrypted data message from the third client 111.

Message sorter 105 in each cluster 101 ensures that the messages are delivered and processed in the correct and same order in all clusters 101. Accordingly, message sorter 105 accounts and corrects for the different latencies and/or network delays affecting data transmission between clients 111 and clusters 101 and between different clusters 101 so that the out-of-order arrival of messages at different clusters 101 does not corrupt the end-to-end encryption used to secure the communications between different clients or endpoints of an encrypted session.

Message distributor 107 receives the sorted or ordered messages from message sorter 105. Message distributor 107 distributes the sorted or ordered messages to clients 111 that connect via cluster 101 of that message distributor 107.

Data store 109 may store the ordered messages or identifiers for the ordered messages. The stored messages or identifiers are used to perform integrity and validation checks across clusters 101. Specifically, the ordered messages or identifiers for the ordered messages may be compared across clusters 101 to determine whether the clusters 101 remain synchronized and are operational. In response to detecting an out-of-sync cluster 101, clusters 101 may revert back to a previous state based on the stored ordered messages that are verified to be synchronized across all clusters 101 of multi-cluster environment 100, and to resume operation from that last synchronized state.

In some example embodiments, message aggregator 103, message sorter 105, and message distributor 107 of each cluster 101 are implemented as a publish-subscribe based messaging system or as an ordered event streaming platform. For instance, message aggregator 103, message sorter 105, and message distributor 107 of each cluster 101 may be implemented as a Kafka® connect solution and/or as Kafka® mirrors, brokers, replicas, zookeepers, transform nodes, and/or other Kafka® components.

Figure 2:
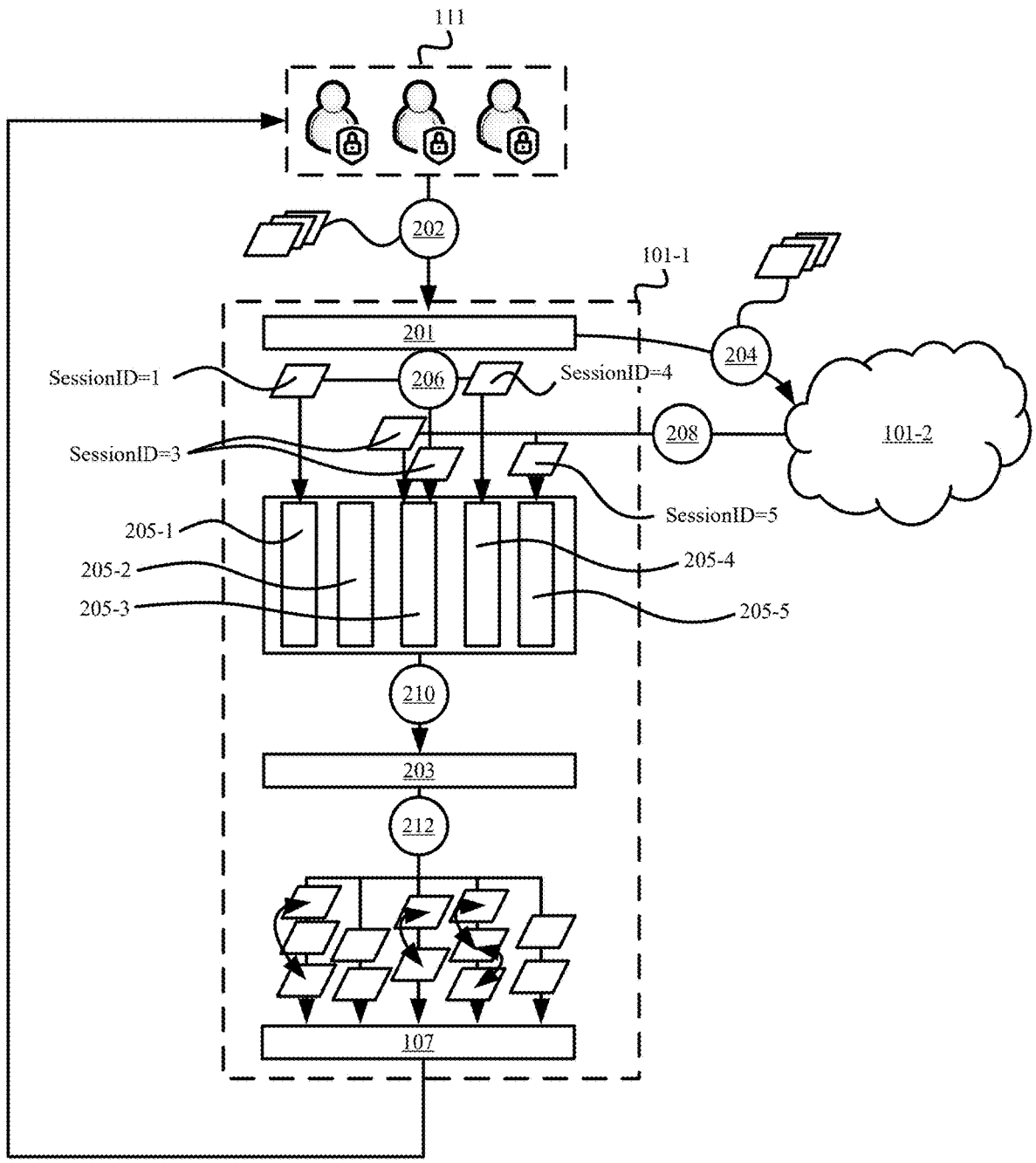
FIG. 2 illustrates example components for implementing a cluster of the multi-cluster environment as part of an ordered event streaming platform in accordance with some embodiments presented herein.

FIG. 2 illustrates example components for implementing first cluster 101-1 of multi-cluster environment 100 as part of an ordered event streaming platform in accordance with some embodiments presented herein. First cluster 101-1 may include topic-based message broker 201 as an implementation of message aggregator 103, and transform node 203 as an implementation of message sorter 105.

Topic-based message broker 201 receives (at 202) messages from clients 111 that directly connect to first cluster 101-1. In some example embodiments, clients 111 send the messages to a server that provides the encrypted service from or around first cluster 101-1, and the server forwards the messages to topic-based message broker 201 in first cluster 101-1 for replication and reordering. The messages may include encrypted session establishment messages, messages for exchanging encryption keys, cipher data, and/or other metadata, and/or other messages with which the end-to-end encryption is established and managed.

Topic-based message broker 201 may associate a timestamp to each received message. The timestamp indicates the time that the message was received by topic-based message broker 201. In addition to the timestamp, topic-based message broker 201 may associate other values to the messages. For instance, topic-based message broker 201 may associate an identifier of first cluster 101-1 to each message that is received (at 202) by topic-based message broker of first cluster 101-1.

Topic-based message broker 201 replicates (at 204) the received messages to other clusters 101 of multi-cluster environment 100. Replicating (at 204) the received message may include publishing the received messages to a messaging queue. From the messaging queue, the published messages are redistributed to subscribers of that messaging queue. The subscribers may correspond to topic-based message brokers 201 in the other clusters 101. The published messages may be pushed to the subscribers immediately upon being entered into the messaging queue. Alternatively, the subscribers may periodically query and pull the published messages from the messaging queue.

Topic-based message broker 201 selectively distributes (at 206) the received messages to different partitions 205-1, 205-2, 205-3, 205-4, and 205-5 (hereinafter collectively referred to as "partitions 205" or individually referred to as "partition 205") based on different topics associated with each partition 205. Each partition 205 may correspond to a message queue for temporarily storing the messages that are associated with a common topic.

The topics associated with each partition 205 may correspond to different encrypted sessions or different encrypted groups that have been created for encrypted communications between different sets of clients 111 that have joined or that belong to the different encrypted sessions or groups. Each partition 205 may be associated with an encrypted session identifier, and the encrypted session identifier may include a value that is created to uniquely identify a particular encrypted session. For instance, a first client may create a first encrypted session and may add a second client and a third client to the first encrypted session so that the first client, the second client, and the third client may have an encrypted session conversation or may exchange encrypted messages with one another or together. The third client may create a second encrypted session and may add the second client and a fourth client to the second encrypted session. The encryption messaging protocol or the encrypted messaging service provider may define a first session identifier for the first encrypted session and a second session identifier for the second encrypted session. The messages sent by a client for a specific encrypted session may include the session identifier of that specific session group, and topic-based message broker 201 may separate the messages based on the included session identifiers. Accordingly, topic-based message broker 201 enters the same session messages into the same queue or partition 205.

Topic-based message broker 201 may also include a Kafka® Topic Replica that receives (at 208) messages from topic-based message brokers 201 of other clusters 101 (e.g., second cluster 101-2). The messages from the other clusters 101 may already be sorted to partitions 205, or may be selectively distributed to partitions 205 by the locally executing instance of topic-based message broker 201.

Transform node 203 receives (at 210) the partitioned encrypted session messages that are organized by topic (e.g., the encrypted session to which they belong). In other words, transform node 203 receives (at 210) the messages for each encrypted session from a different message queue or partition 205 that separates or differentiates those messages from messages of other encrypted sessions.

Transform node 203 reorders (at 212) the messages for each encrypted session in batches that span a specified time window or interval. The reordering (at 212) to the different batches provides transform node 203 time to receive all messages issued for an encrypted session over the specified time window even if some of the messages arrive out-of-order due to the replication across clusters 101, network delays associated with receiving and replicating the messages, and/or other factors.

The reordering (at 212) may be based on timestamps associated with each message. The timestamp of a particular message may correspond to the time at which a topic-based message broker 201 in any cluster 101 directly receives the particular message from a client 111. Accordingly, the timestamp does not account for and/or is not affected by the delay associated with replicating the particular message across other clusters 101 of multi-cluster environment 100.

In the event of two or more messages in the same partition 205 having the same timestamp, transform node 203 may reorder (at 212) the two or more messages according to the identifiers of the clusters 101 that received those messages. For instance, each cluster 101 may be assigned a cluster identifier. When messages are replicated from a particular cluster 101 to other clusters 101, the particular cluster 101 may tag or otherwise associate its cluster identifier to the replicated messages.

In the event of two or more messages in the same partition 205 having the same timestamp and being directly received from clients 111 in the same cluster 101, the two or more messages may be reordered (at 212) based on their arrival times or order-of-arrival at the same cluster 101. In some such example embodiments, topic-based message broker 201 may provide an ordering index or other value to the two or more messages so that the ordering of the two or more messages with the same timestamp is maintained when the two or more messages are replicated to other clusters 101.

Transform node 203 may provide the reordered batched messages to message distributor 107. Message distributor 107 may distribute the reordered batched messages to clients 111 that connect to or otherwise access the encrypted services via first cluster 101-1. Specifically, message distributor 107 may distribute the reordered batched message for a particular encrypted session that is identified by a particular session identifier to a subset of clients 111 that are members of that particular encrypted session and that connect to or otherwise access the encrypted services via first cluster 101-1.

Each cluster 101 of multi-cluster environment 100 performs a similar reordering of the received and replicated messages. The reordering ensures that each message distributor 107 distributes the same messages in the same order to all clients 111 regardless of which cluster 101 those clients 111 are connected to and/or receive the reordered batched message from.

In some example embodiments, clusters 101 of multi-cluster environment 100 execute a shared and distributed Kafka® instance. In some such example embodiments, the clocks used to define the timestamps at topic-based message brokers 201 of different clusters 101 are synchronized. Time drift may be accounted for by introducing a random epsilon value to the timestamps.

Figure 3:
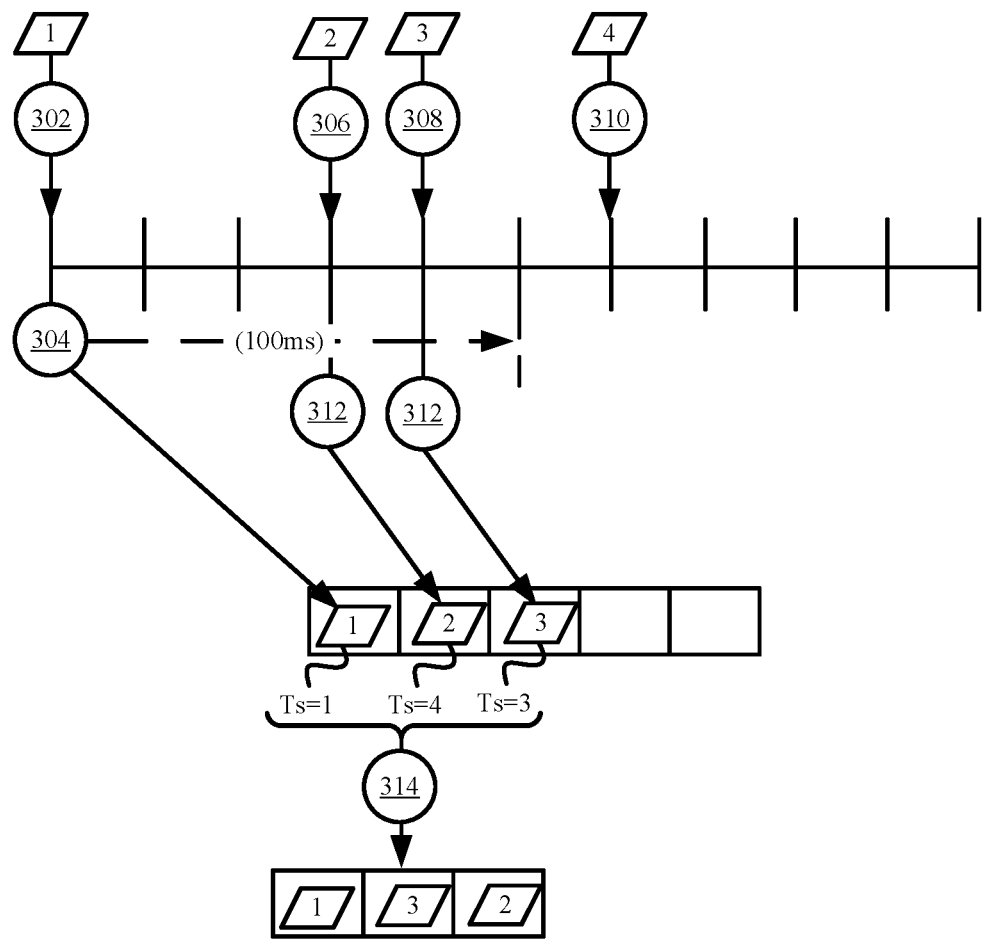
FIG. 3 illustrates an example of generating an ordered batched set of messages for consistent distribution of messages from all clusters of the multi-cluster environment in accordance with some embodiments presented herein.

FIG. 3 illustrates an example of generating an ordered batched set of messages for consistent distribution of messages from all clusters 101 of multi-cluster environment 100 in accordance with some embodiments presented herein. Transform node 203 receives (at 302) a first message with a particular session identifier and a first timestamp. The first message may be a message that is received directly from a client 111 or may be a replicated message from another cluster 101.

Transform node 203 defines (at 304) a new message sequence batch, enters the first message in the new message sequence batch, and starts a timer to wait a specified duration for other messages of that new message sequence batch that may arrive out-of-order. In some example embodiments, the specified duration is set according to a maximum amount of latency associated with replicating messages across multi-cluster environment 100. For instance, the specified duration may be set to 100 milliseconds, and the specific duration may span from the timestamp of the first message or the time at which transform node 203 receives (at 302) the first message.

Transform node 203 waits the specified duration after the first timestamp of the first message to aggregate additional messages that belong with the new message sequence batch. During this time, transform node 203 receives (at 306) a second message with the particular session identifier and a second timestamp, and receives (at 308) a third message with the particular session identifier and a third timestamp. Specifically, transform node 203 inspects the second timestamp and the third timestamp to determine that the values are within a time between the first timestamp and the specified duration added to the first timestamp.

Transform node 203 may close the new message sequence batch at the expiration of the time window that is set for the new message sequence batch based on the first timestamp and the specified duration spanned by the new message sequence batch. In some example embodiments, transform node 203 may wait an additional amount of time after the expiration of the time window to account for replication, network transmission, and/or other delays that may cause messages with timestamps within the time window to arrive after the expiration of the time window. In some such example embodiments, transform node 203 may close the new message sequence batch in response to receiving (at 310) a fourth message with the particular session identifier and a fourth timestamp that is after the specified duration added to the first timestamp.

Transform node 203 enters (at 312) the received messages with timestamps that are within the time window of the new message sequence batch. As shown in FIG. 3, transform node 203 enters (at 312) the second message and the third message in the new message sequence batch.

The messages entered (at 304 and 312) into the new message sequence batch may be out-of-order. For instance, transform node 203 may receive (at 306) the second message before the third message even though the third message has an earlier timestamp because the second message is received directly by the cluster 101 running transform node 203, whereas the third message may initially be received at another cluster 101 and then replicated to the cluster 101 running transform node 203.

Accordingly, transform node 203 inspects the timestamps of the messages that were entered (at 304 and 312) into the new message sequence batch, and reorders (at 314) the messages according to their timestamps. The reordered messages in the new message sequence batch may then be distributed to connected clients 111. Transform node 203 may define a next message sequence batch based on the fourth timestamp of the fourth message, enter subsequently arriving messages into the next message sequence batch that have timestamps between the fourth timestamp and the specified duration after the fourth timestamp, and reorder the messages in the next message sequence batch once the next message sequence batch is closed (e.g., receiving a message with a timestamp that is after the specified duration from the fourth timestamp).

Transform nodes 203 in different clusters 101 perform the same batching and reordering of the messages. Consequently, the messages are distributed to connected clients 111 in the same order or sequence from every cluster 101 regardless of the different orders with which those same messages arrive at different clusters 101.

In some example embodiments, topic-based message broker 201 enters messages received from clients 111 and messages replicated by other clusters 101 into data store 109 of the corresponding cluster 101. Transform node 203 accesses the messages from data store 109 in order to identify the subset of messages for each message sequence batch prior to reordering that subset of messages.

Figure 4:
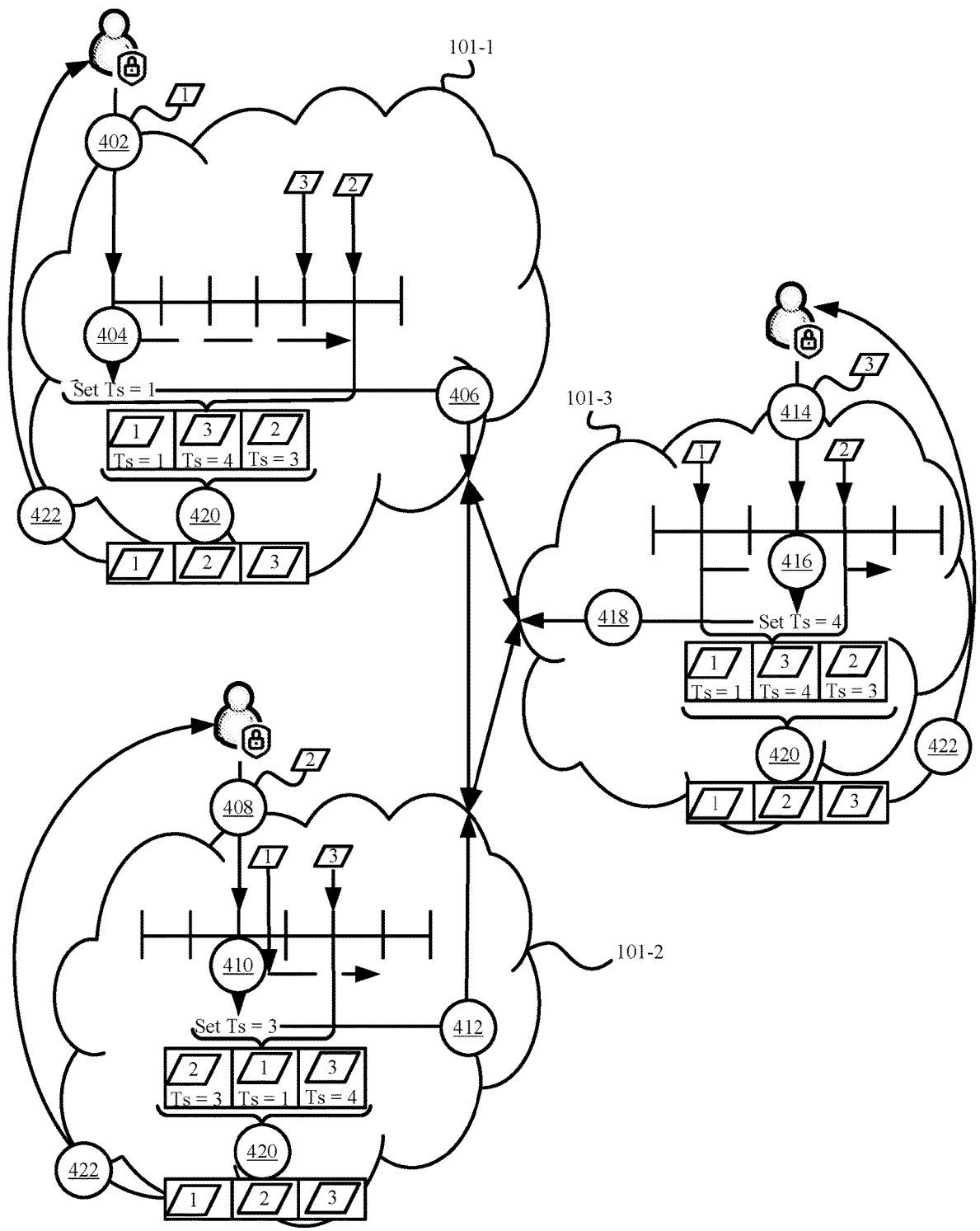
FIG. 4 illustrates an example of reordering messages that arrive at different times in the different clusters to provide a commonly ordered redistribution of the messages in accordance with some embodiments presented.

FIG. 4 illustrates an example of reordering messages that arrive at different times in different clusters 101 to provide a commonly ordered redistribution of the messages in accordance with some embodiments presented. As shown in FIG. 4, first cluster 101-1 receives (at 402) a first message at a first time, generates (at 404) a first timestamp for the first message based on the first time, and replicates (at 406) the first message with the first timestamp to other clusters 101. Second cluster 101-2 receives (at 408) a second message at a second time, generates (at 410) a second timestamp for the second message based on the second time, and replicates (at 412) the second message with the second timestamp to other clusters 101. Third cluster 101-3 receives (at 414) a third message at a third time, generates (at 416) a third timestamp for the third message based on the third time, and replicates (at 418) the third message with the third timestamp to other clusters 101.

Due to different latencies, delays, and/or performance experienced by each cluster 101, each cluster 101 receives the first, second, and third messages. Nonetheless, transform node 203 of each cluster 101 reorders (at 420) the messages according the timestamps provided by the different receiving clusters 101 so that the messages are redistributed (at 422) from each cluster 101 to connected clients in the same order.

In some example embodiments, multi-cluster environment 100 may introduce or generate system messages. In some such example embodiments, each cluster 101 or topic-based message broker 201 of each cluster 101 may periodically generate and enter a system message into the publish-subscribe based messaging system for replication to other clusters. In some example embodiments, the system messages are sent at fixed intervals. For instance, the system messages may be distributed every one millisecond, or may be distributed based on the time window of the message sequence batches so that at least one system message is sent during the interval associated with each message sequence batch.

The system messages may correspond to dummy keepalive messages. More specifically, the timestamps associated with the system messages may be used to determine when the time window for a message sequence batch has expired and the messages in that message sequence batches should be reordered and distributed to client 111. For instance, a particular cluster 101 may receive a first message that starts a current message sequence batch, and a second client-generated message with a timestamp that is within the time window of the current message sequence batch. Clients 111 may not generate any additional message for some period of time and the particular cluster 101 may leave the current message sequence batch open in case additional messages with timestamps in the time window of current message sequence batch are delayed. However, since clusters 101 periodically generate and distribute the system messages with timestamps, the particular cluster 101 may receive the system message generated by another cluster 101, may determine that the timestamp of the system message is after the expiration of the current message sequence, and may further determine that no additional client-generated messages will fall in the current message sequence batch. Accordingly, the particular cluster 101 may close the message sequence batch, order the first and second messages based on their timestamps, and distribute the ordered messages to connected clients 111. In some embodiments, the system messages may be removed from a message sequence batch or may not be entered into a message sequence batch to avoid redistribution to clients 111.

Figure 5:
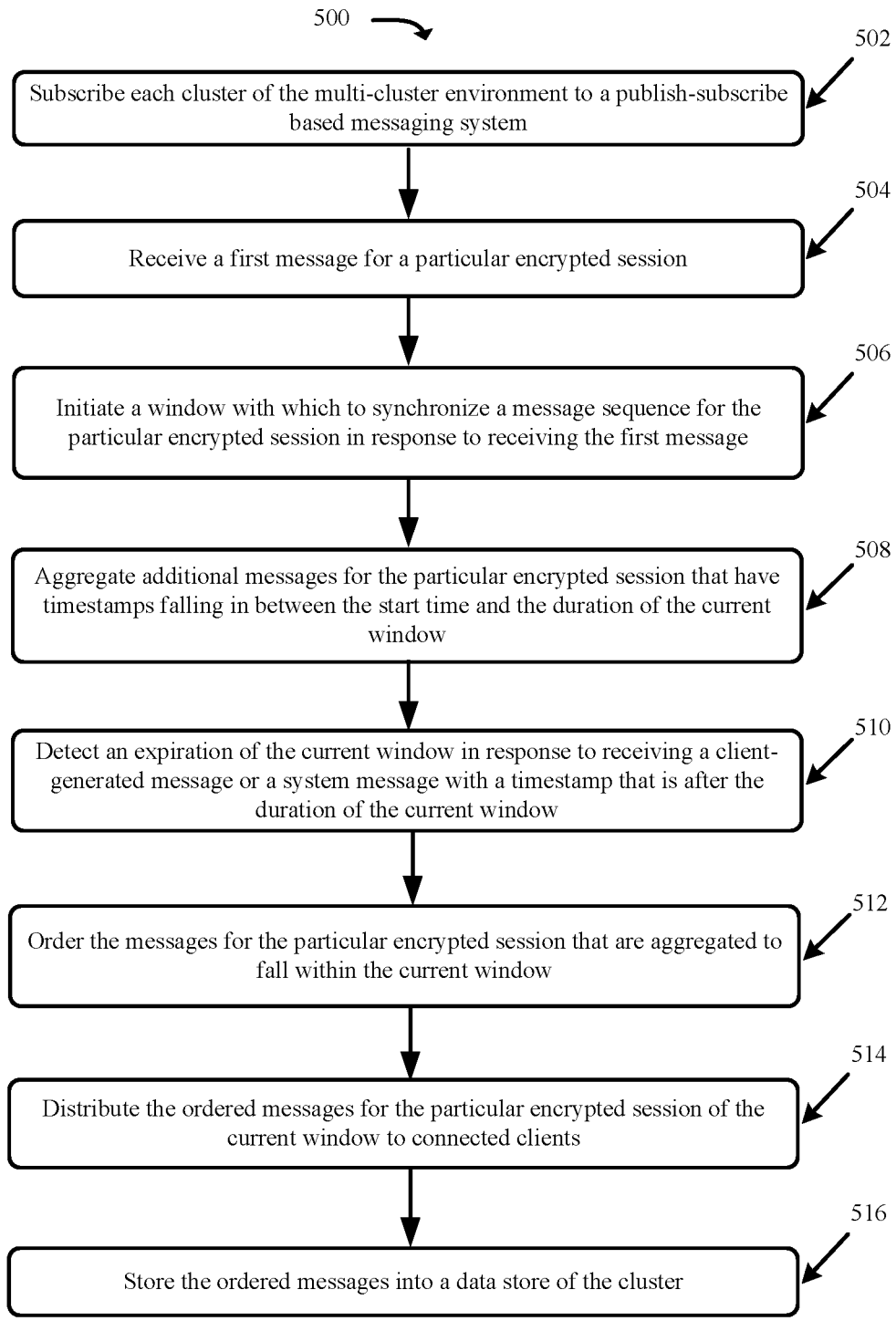
FIG. 5 presents a process for synchronizing the order of messages across different clusters of the multi-cluster environment in accordance with some embodiments presented herein.

FIG. 5 presents a process 500 for synchronizing the order of messages across different clusters 101 of multi-cluster environment 100 in accordance with some embodiments presented herein. Process 500 is implemented by each cluster 101 of multi-cluster environment 100. Specifically, process 500 may be implemented by message aggregator 103, sorter 105, and distributor 107 of each cluster 101 or by topic-based message broker 201 and transform node 203 of each cluster.

Process 500 includes subscribing (at 502) each cluster 101 of multi-cluster environment 100 to a publish-subscribe based messaging system. Subscribing (at 502) the clusters 101 may include configuring each topic-based message brokers 201 in each cluster 101 to partition, replicate, and/or distribute messages for different encrypted sessions based on the different session identifier associated with each encrypted session. In some example embodiments, whenever a new encrypted session is created within the encrypted communication service running through multi-cluster environment 100, topic-based message broker 201 within each cluster 101 of multi-cluster environment 100 is automatically updated to subscribe and receive messages from that new encrypted session. In some example embodiments, Kafka® Zookeeper may be used to configure the session identifiers that each cluster 101 subscribes (at 502) to.

Process 500 receiving (at 504) a first message for a particular encrypted session. Cluster 101 may receive (at 504) the first message from a connected client 111 or from another cluster 101 in response to subscribing (at 502) to the publish-subscribe based messaging system. The first message may include a control message of the encryption protocol (e.g., a join, add, remove, handshake, cipher exchange, and/or other message for establishing, modifying, or managing the particular encrypted sessions), a data message for the particular encrypted session (e.g., encrypted textual, audio, video, and/or other communication message), or a system message created by another cluster 101.

Process 500 includes initiating (at 506) a window with which to synchronize a message sequence for the particular encrypted session in response to receiving (at 504) the first message. Initiating (at 506) the window may include defining the start time of the window based on a timestamp of the first message or the time at which the first message is first received by one cluster 101 of multi-cluster environment 100, and specifying a duration with which to synchronize the message sequence for the particular encrypted session. The duration may be specified as 100 milliseconds or some other amount of time from the start time.

Process 500 includes aggregating (at 508) additional messages for the particular encrypted session that have timestamps falling in between the start time and the duration of the current window. The additional messages may arrive out-of-order due to network latency affecting the distribution of messages for the particular encrypted session that are received by various clusters 101 and that are replicated to the other clusters 101 by the publish-subscribe based messaging system. In other words, the additional messages may be directly issued to a particular cluster 101 by clients 111 or may be received by other clusters 101 and replicated to the particular cluster 101 via the publish-subscribe based messaging system.

To account for time drift, a random epsilon value may be added to timestamps generated by clusters 101. The random epsilon value may be defined differently for each cluster 101 and may be between the range of negative and positive absolute maximum time drift experienced by all clusters 101 or a particular cluster 101. The maximum time drift is the value of maximum possible time drift in the time synchronization algorithm of a cluster 101.

Process 500 includes detecting (at 510) an expiration of the current window. The expiration of the current window may be trigged by receipt of a client-generated message or a system message with a timestamp that is after the duration of the current window.

Process 500 includes ordering (at 512) the client-generated messages for the particular encrypted session that are aggregated (at 508) to fall within the current window. The ordering (at 512) includes rearranging the messages based on their timestamps or another synchronization parameter rather than the arrival time of the messages at the cluster 101. The ordering (at 512) ensures that clients 111 of the particular encrypted session receive the messages in a consistent order from each cluster 101 of multi-cluster environment 100.

Process 500 includes distributing (at 514) the ordered messages for the particular encrypted session of the current window to clients 111 that connect or access the encrypted session via cluster 101 implementing process 500. Accordingly, the ordered messages may be distributed (at 514) in a different order than the order with which the messages arrive at the cluster 101.

Process 500 includes storing (at 516) the ordered messages into data store 109 of the cluster 101. The ordered messages may be stored (at 516) to perform integrity, validation, and/or other checks that ensure and verify that all clusters 101 remain synchronized and are operational. In some example embodiments, the storing (at 516) operation may include storing identifiers for each of the ordered messages. The message identifier may correspond to a checksum, hash, or other value that uniquely identifies each message without the contents of the message.

Process 500 restarts by aggregating the messages for a next window that starts after expiration of the current window (e.g., the duration added to the start time of the current window), ordering the messages belonging to the next window, and distributing the ordered messages. Process 500 continues the message synchronization for each encrypted session until that encrypted session is removed or closed.

In some example embodiments, the generation and distribution of system messages between clusters assist in verifying the operation of each cluster 101. In particular, the system messages are used to verify that clusters 101 are operational and are correctly exchanging messages even when the connected clients 111 do not generate messages for any of the encrypted session. A system message may be generated and distributed for each message sequence batch or the interval spanned by each message sequence batch so that batches that do not receive messages from clients 111 may be differentiated from instances when a cluster 101 suffers a failure and/or is unable to receive messages from clients 111 or other clusters 101.

Figure 6:
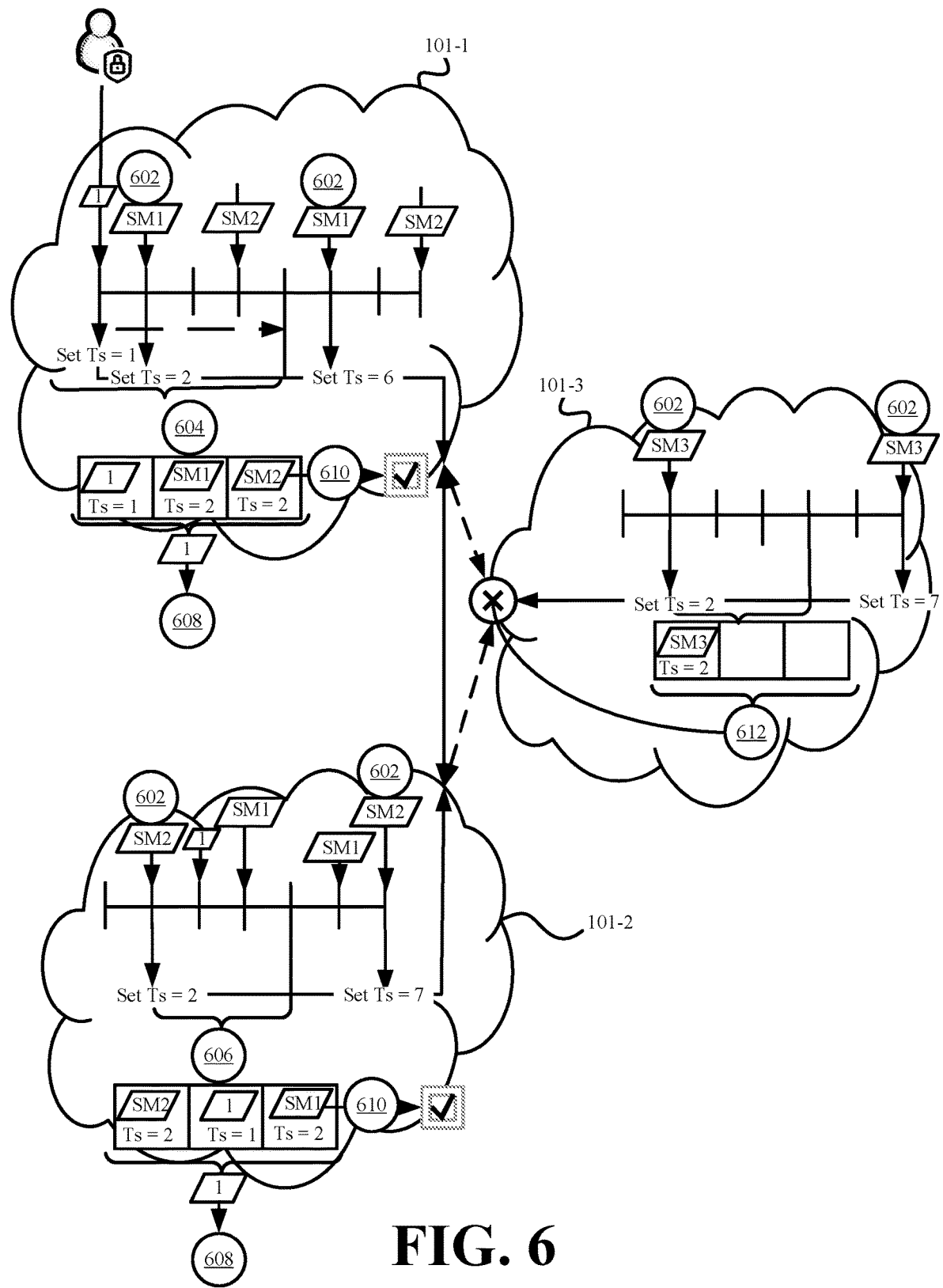
FIG. 6 illustrates an example of detecting an unavailable or failing cluster based on system messages in accordance with some embodiments presented herein.

FIG. 6 illustrates an example of detecting an unavailable or failing cluster based on system messages in accordance with some embodiments presented herein. During an interval of a current message sequence batch, first cluster 101-1, second cluster 101-2, and third cluster 101-3 of multi-cluster environment 100 may generate (at 602) system messages. The system messages from each cluster 101 are submitted to the publish-subscribe based messaging system for replication to all other clusters 101 along with any client 111 generated messages.

First cluster 101-1 receives (at 604) the system messages generated by second cluster 101-2, and second cluster 101-2 receives (at 606) the system messages generated by first cluster 101-1. However, neither first cluster 101-1 nor second cluster 101-2 receive the system messages generated by third cluster 101-3. Third cluster 101-3 also does not receive the system messages generated by first cluster 101-1 or second cluster 101-2.

Even if no other messages are generated by clients 111 for any of the encrypted session during this current message sequence batch, first cluster 101-1 and second cluster 101-2 may close (at 608) the current message sequence batch, remove any system messages from the batch, reorder remaining client 111 generated messages based on their timestamps, and distribute the reordered client 111 generated messages to connected clients 111. If no client 111 generated messages are received during the time interval associated with the current messages sequence batch, first cluster 101-1 and second cluster 101-2 may use the system generated messages that are received from other clusters 101 to close the batch without distributing any messages to connected clients 111. Moreover, first cluster 101-1 and second 101-2 may use the system generated messages from other clusters 101 to verify (at 610) that they are operational.

Third cluster 101-3 determines (at 612) that it is experiencing a failure and has become unavailable to the rest of the multi-cluster environment 100 because it has not received any system messages from other clusters 101 during the current message sequence batch. Accordingly, action May be taken to reset, restore, or remedy third cluster 101-3 and/or to reconnect clients 111 that were previously connected to third cluster 101-3 to one of first cluster 101-1 or second cluster 101-2.

Clusters 101 may also be configured to perform periodic integrity checks. The integrity checks verify that clusters 101 remain synchronized and distribute the same messages in the same order to clients 111. The integrity checks may be performed based on message sequence batches that are generated and/or stored to data store 109 of each cluster 101.

Figure 7:
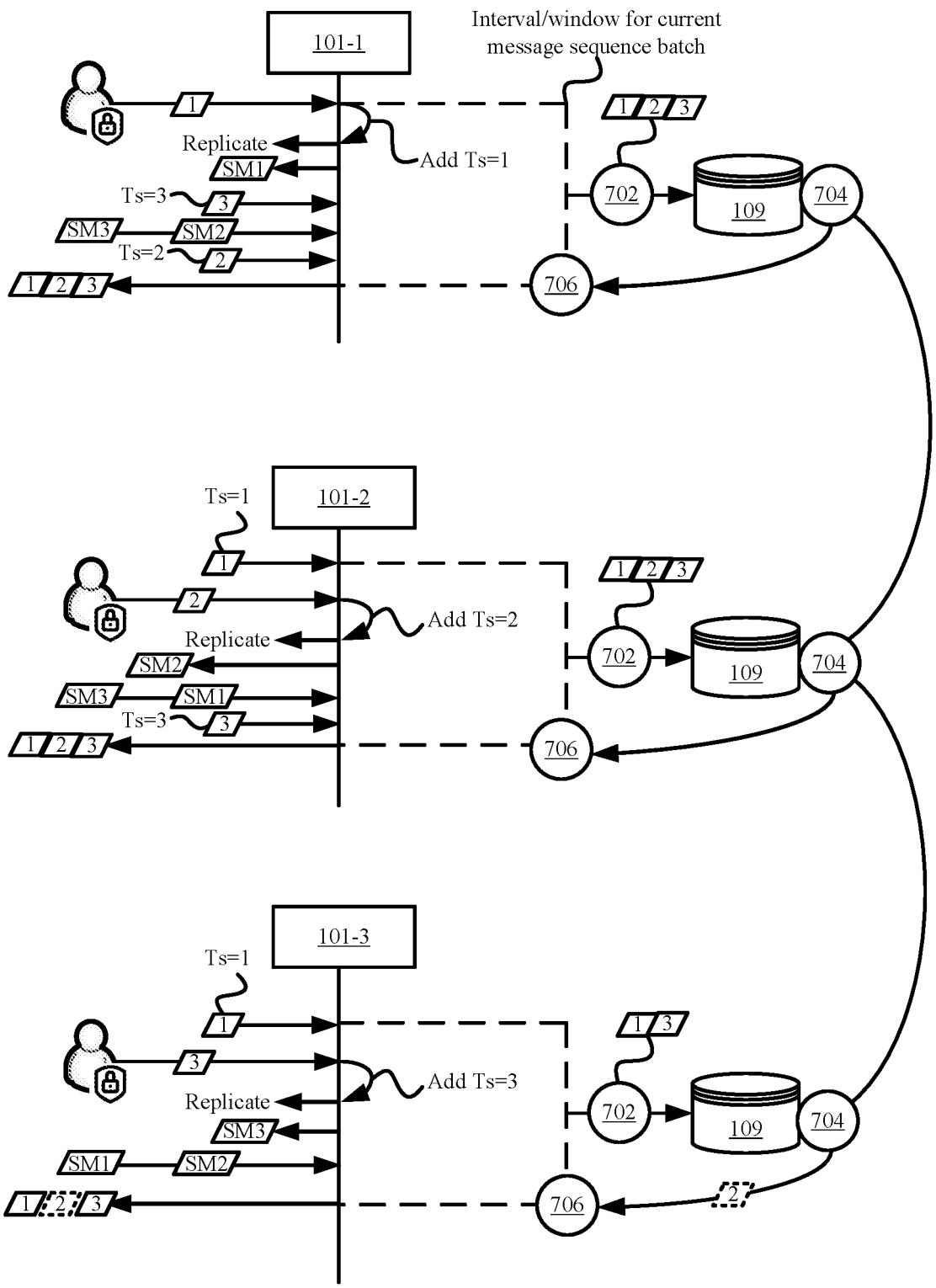
FIG. 7 illustrates an example of integrity checks for verifying cluster synchronization in accordance with some embodiments presented herein.

FIG. 7 illustrates an example of the integrity checks for verifying cluster synchronization in accordance with some embodiments presented herein. First cluster 101-1, second cluster 101-2, and third cluster 101-3 receive, aggregate, and/or order a set of messages during a current message sequence batch. Each cluster 101 may store the set of messages it receives from clients 111 and/or other clusters 101 during the interval of the current message sequence batch to its data store 109. Each cluster 101 may also store (at 702) marker identifiers for each message in the set of messages it received for the current message sequence batch. The marker identifiers may include message checksums, hashes, or other values that uniquely identify each message and/or the contents of each message.

Clusters 101 may periodically exchange integrity messages with one another. For instance, prior to distributing the current message sequence batch, clusters 101 may perform an integrity check. The integrity messages may include the marker identifiers for the set of messages of the current message sequence batch or for any messages stored in data store 109 that have not been verified as having been received and/or distributed by other clusters 101 in the same order.

Clusters 101 receive the integrity messages from other clusters 101 and compare (at 704) the sequence of marker identifiers in the integrity messages with the sequence of marker identifiers in their local data store 109. In some example embodiments, clusters 101 verify their stored marker identifiers in data store 109 with the marker identifiers in the integrity messages received from all other clusters 101. In some other example embodiments, clusters 101 are configured to provide the integrity messages to only one other cluster 101, and each cluster 101 receives and compares against the integrity messages received from just one other cluster 101. A particular cluster 101 then verifies its stored marker identifiers in data store 109 with the marker identifiers in the integrity messages from the one other cluster 101 such that each cluster 101 verifies the marker identifiers with the marker identifiers of a different cluster 101 until all marker identifiers stored by all clusters 101 are verified in a distributed manner.

In response to the stored marker identifiers matching the values and ordering of the marker identifiers in the integrity messages, clusters 101 successfully verify that all clusters 101 have or will distribute the same messages in the same order to clients 111. Upon successful verification, the marker identifiers may be marked as verified in data store 109 or may be removed from data store 109 after verification. Additionally, each set of messages that is successful verified may be distributed to clients 111.

It is possible that the current message sequence batch of each cluster 101 contains a different number of messages pending the integrity check. The integrity check may still be performed and different numbers of message may be distributed from each cluster 101 so long as the same messages are distributed in the same order. For instance, first cluster 101-1 may receive, aggregate, and order three messages with marker identifiers 1, 2, and 3 for the current message sequence batch, and second cluster 101-2 may receive, aggregate, and order two messages with marker identifiers 1 and 2 for the current message sequence batch. In this instance, first cluster 101-1 and second cluster 101-2 may verify and distribute the messages with marker identifiers 1 and 2, and first cluster 101-1 may retain the message with marker identifier 3 for subsequent verification in a next message sequence batch.

Clusters 101 detect a synchronization issue in response to one stored marker identifier being mismatched with the value or ordering of the marker identifiers in the integrity messages. In such instances, clusters 101 may communicate the synchronization issue across multi-cluster environment 100, may discard (at 706) or prevent distribution of the set of messages with the synchronization issue, and/or may perform remedial actions to correct the set of messages with the synchronization issue.

The remedial actions may include delaying the distribution of the set of messages to see if the delivery of any missing messages were delayed because of network issues. A missing message is detected when the marker identifier of a newly received message matches the marker identifier that was missing when performing the integrity checks. The missing message may then be placed in the correct order of the pending set of messages, and if the missing message resolves the synchronization issue, all clusters 101 may distribute the verified set of messages.

The remedial actions may include determining which cluster 101 is out-of-sync with other clusters 101, and causing the out-of-sync cluster 101 to request missing messages from any of the in-sync clusters 101. Once the missing messages are received at the out-of-sync cluster 101 and reordered with the other messages, the integrity check may be performed again, and clusters 101 may distribute the set of messages that are verified to be synchronized (e.g., same messages in the same order across clusters 101).

The remedial actions may also include notifying clients 111 to rollback state to a previously synchronized state (e.g., withdraw or discard messages that were out-of-sync). Clusters 101 may then correct the state with a reissued set of messages that are determined to be synchronized across all clusters 101.

In some examples embodiments, the integrity checks may be performed for messages of distinct encrypted sessions. For instance, rather than compare each and every marker identifier across clusters 101, the marker identifiers may be segmented with a session identifier, wherein each segmented set of marker identifiers identifies the order of messages for a different encrypted session. Performing the integrity checks for messages of distinct encrypted sessions allows for synchronization issues to affect smaller subsets of clients 111 involved in a particular encrypted session rather than all clients 111. Accordingly, the remedial actions may be performed to rollback and restore state for the affected subset of clients 111 of a particular encrypted session rather than all clients 111 that may or may not have been affected by the detected synchronization issue.

Multi-cluster environment 100 may perform the integrity checks using different artificial intelligence and/or machine learning ("AI/ML") techniques. The AI/ML techniques may provide prediction or early detection of a synchronization issue, an unavailable cluster 101, and/or other issues that may lead to loss of service for one or more clients 111.

In some example embodiments, the AI/ML techniques analyze the latency associated with client 111 generated messages and system generated messages, and may dynamically adjust the duration for the message sequence batch at each cluster 101 according to the determined amount of latency. For instance, first cluster 101-1 may experience fewer delays than second cluster 101-2 in receiving messaging. Accordingly, the AI/ML techniques may set the message sequence batches of first cluster 101-1 to have a shorter window or duration than the message sequence batches of second cluster 101-2. By accounting for the different latencies experienced by clusters 101, the number of false issues detected during the integrity checks may be reduced.

In some example embodiments, the AI/ML techniques may bias the message timestamps to minimize message reordering performed by transform node 203. For instance, the AI/ML techniques may determine that replicated messages received from other clusters 101 arrive a set amount of time after the timestamp that is assigned to those messages. Accordingly, the AI/ML techniques may bias the timestamps that are given to messages directly received from clients 111 to include account for that set amount of time so that when the messages are entered into the batches, fewer messages need to be reordered.

In some example embodiments, the AI/ML techniques may monitor the network links or paths to each cluster 101, and may detect packet loss, congestion, and/or other issues that affect performance on those network link. The AI/ML techniques may preemptively route clients 111 between clusters 101 to avoid the congested and/or failing network links, and thereby prevent those clients 111 from becoming out-of-sync with other clients 111. Similarly, the AI/ML techniques may monitor load or the number of clients 111 connected to each cluster 101, and may redistribute that load to avoid any single cluster 101 from a disproportionate load.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The invention claimed is:
1. A computer-implemented method for providing end-to-end encryption services across a plurality of clusters, the computer-implemented method comprising:
    establishing an encrypted session for encrypted communications between a plurality of endpoints that access the encrypted session from different clusters of the plurality of clusters;
    receiving a first set of messages with a session identifier at a first cluster of the plurality of clusters, wherein the session identifier uniquely identifies the encrypted ses- sion from a plurality of other encrypted sessions hosted across the plurality of clusters, and wherein the first set of messages specify a first set of changes to a changing state of the encrypted session;

receiving a second set of messages with the session identifier at a second cluster of the plurality of clusters, wherein the second set of messages specify a second set of changes to the changing state of the encrypted session;

replicating the first set of messages and the second set of messages across the plurality of clusters;

detecting, at a third cluster of the plurality of clusters, a particular message, from a collection of messages that includes the first set of messages and the second set of messages, with a timestamp that is earlier than a timestamp of other messages in the collection of messages;

defining a message sequence window with a subset of messages from the collection of messages arranged in an order that differs from an ordering of messages in the collection of messages, wherein defining the message sequence window comprises:
  detecting the subset of messages from the collection of messages with timestamps that are between the timestamp of the particular message and a specified duration after the timestamp of the particular message; and
  ordering the subset of messages in the message sequence window according to the timestamp of each message in the subset of messages; and distributing the subset of messages from the third cluster to a set of the plurality of endpoints that exchange messages for the encrypted session via the third cluster, wherein distributing the subset of messages comprises synchronizing the changing state of the encrypted session across the plurality of endpoints.

2. The computer-implemented method of claim 1, further comprising:
  associating a first timestamp to a first message in the subset of messages upon receiving the first message at the first cluster;
  associating a second timestamp, that is after the first timestamp, to a second message in the subset of messages upon receiving the second message at the second cluster; and
  receiving the second message at the third cluster before the first message in response to replicating the first set of messages and the second set of messages.

3. The computer-implemented method of claim 1, further comprising:
  distributing the subset of messages from the first cluster and the second cluster to different sets of the plurality of endpoints in a same order as the subset of messages distributed from the third cluster based on the ordering of the subset of messages in the message sequence window.

4. The computer-implemented method of claim 1, further comprising:
  receiving the collection of messages at the first cluster in a different order than the third cluster receives the collection of messages as a result of said replicating;
  initiating the message sequence window at the first cluster based on the particular message with the timestamp that is earlier than a timestamp of other messages in the collection of messages; and
  ordering the subset of messages in the message sequence window at the first cluster in a same order as the subset of messages in the message sequence window at the third cluster based on the timestamp of each message in the subset of messages.

5. The computer-implemented method of claim 1, wherein defining the message sequence window further comprises:
  aggregating a plurality of messages that are replicated from the first cluster and the second cluster and that are generated by the set of endpoints at the third cluster for a time that extends past the specified duration after the timestamp of the particular message; and
  filtering the plurality of messages to the subset of messages with timestamps that are between the timestamp of the particular message and the specified duration after the timestamp of the particular message.

6. The computer-implemented method of claim 1, further comprising:
  generating a periodic system message at each cluster of the plurality of clusters; and
  wherein replicating the first set of messages and the second set of messages comprises:
    replicating the periodic system message that is generated at each cluster across the plurality of clusters.

7. The computer-implemented method of claim 1, further comprising:
  detecting, at the third cluster, that the second cluster has become unsynchronized with other clusters of the plurality of clusters in response to the third cluster not receiving a system message that is generated and replicated by the second cluster in between a time spanning the timestamp of the particular message and the specified duration after the timestamp of the particular message.

8. The computer-implemented method of claim 7, further comprising:
  routing a subset of the plurality of endpoints that were connected to the second cluster to the third cluster in response to detecting that the second cluster has become unsynchronized.

9. The computer-implemented method of claim 7 further comprising:
  distributing the subset of messages from the third cluster to a subset of the plurality of endpoints that exchange messages for the encrypted session via the second cluster.

10. The computer-implemented method of claim 1, further comprising:
  associating a marker identifier for each message in the message sequence window;
  defining a marker identifier sequence based on the ordering of the subset of messages in the message sequence window and the marker identifier associated with each message in the subset of messages; and
  detecting a synchronization issue across the plurality of clusters in response to the marker identifier sequence of the third cluster containing a different marker identifier or a different position for a marker identifier than a marker identifier sequence defined by another cluster of the plurality of clusters.

11. The computer-implemented method of claim 10, further comprising:
  discarding messages in the message sequence window that are associated with and come after the different marker identifier or the different position for the marker identifier in the marker identifier sequence of the third cluster.

12. The computer-implemented method of claim 1, further comprising:
- detecting, at the third cluster, a new message with a timestamp that is after the timestamp of the particular message and the specified duration after the timestamp of the particular message; and
- closing the message sequence window in response to detecting the new message, wherein closing the message sequence window comprises said distributing of the subset of messages from the third cluster.

13. The computer-implemented method of claim 1, further comprising:
- detecting, at the third cluster, a new message with a timestamp that is after the timestamp of the particular message and the specified duration after the timestamp of the particular message; and
- defining a next message sequence window with a second subset of messages from the collection of messages that have timestamps between the timestamp of the new message and the specified duration after the timestamp of the new message and that are ordered according to the timestamp of each message in the second subset of messages.

14. A system for providing end-to-end encryption services across a plurality of clusters, the system comprising:
- an encrypted session providing for encrypted communications between a plurality of endpoints that access the encrypted session from different clusters of the plurality of clusters;
- a first cluster of the plurality of clusters with one or more processors configured to:
  - receive a first set of messages with a session identifier, wherein the session identifier uniquely identifies the encrypted session from a plurality of other encrypted sessions hosted across the plurality of clusters, and wherein the first set of messages specify a first set of changes to a state of the encrypted session; and
  - replicate the first set of messages across the plurality of clusters;
- a second cluster of the plurality of clusters with one or more processors configured to:
  - receive a second set of messages with the session identifier, wherein the second set of messages specify a second set of changes to the state of the encrypted session; and
  - replicate the second set of messages across the plurality of clusters; and
- a third cluster of the plurality of clusters with one or more processors configured to:
  - detect a particular message, from a collection of messages that includes the first set of messages and the second set of messages, with a timestamp that is earlier than a timestamp of other messages in the collection of messages;
  - define a message sequence window with a subset of messages from the collection of messages arranged in an order that differs from an ordering of messages in the collection of messages, wherein defining the message sequence window comprises:
    - detecting the subset of messages from the collection of messages with timestamps that are between the timestamp of the particular message and a specified duration after the timestamp of the particular message; and
    - ordering the subset of messages in the message sequence window according to the timestamp of each message in the subset of messages; and
  - distribute the subset of messages from the third cluster to a set of the plurality of endpoints that exchange messages for the encrypted session via the third cluster, wherein distributing the subset of messages comprises synchronizing the state of the encrypted session across the plurality of endpoints.

15. The system of claim 14,
- wherein the one or more processors of the first cluster are further configured to:
  - associate a first timestamp to a first message in the subset of messages upon receiving the first message;
- wherein the one or more processors of the second cluster are further configured to:
  - associate a second timestamp, that is after the first timestamp, to a second message in the subset of messages upon receiving the second message; and
- wherein the one or more processors of the third cluster are further configured to:
  - receive the second message before the first message in response to replicating the first set of messages and the second set of messages.

16. A non-transitory computer-readable medium storing program instructions that, when executed by one or more hardware processors of multi-cluster environment, cause the multi-cluster environment to perform operations comprising:
- establish an encrypted session for encrypted communications between a plurality of endpoints that access the encrypted session from different clusters of the multi-cluster environment;
- receive a first set of messages with a session identifier at a first cluster of the multi-cluster environment, wherein the session identifier uniquely identifies the encrypted session from a plurality of other encrypted sessions hosted across the multi-cluster environment, and wherein the first set of messages specify a first set of changes to a changing state of the encrypted session;
- receive a second set of messages with the session identifier at a second cluster of the multi-cluster environment, wherein the second set of messages specify a second set of changes to the changing state of the encrypted session;
- replicate the first set of messages and the second set of messages across the multi-cluster environment;
- detect, at a third cluster of the plurality of clusters, a particular message, from a collection of messages that includes the first set of messages and the second set of messages, with a timestamp that is earlier than a timestamp of other messages in the collection of messages;
- define a message sequence window with a subset of messages from the collection of messages arranged in an order that differs from an ordering of messages in the collection of messages, wherein defining the message sequence window comprises:
  - detecting the subset of messages from the collection of messages with timestamps that are between the timestamp of the particular message and a specified duration after the timestamp of the particular message; and
  - ordering the subset of messages in the message sequence window according to the timestamp of each message in the subset of messages; and
- distribute the subset of messages from the third cluster to a set of the plurality of endpoints that exchange messages for the encrypted session via the third cluster, wherein distributing the subset of messages comprises synchronizing the changing state of the encrypted session across the plurality of endpoints.

17. The computer-implemented method of claim 1, further comprising:
generating a first plurality of marker identifiers that uniquely identify each message in the subset of messages and the ordering of the subset of messages in the message sequence window;
distributing the first plurality of marker identifiers from the third cluster to the second cluster;
detecting a synchronization issue between the second cluster and the third cluster in response to the first plurality of marker identifiers being mismatched with a second plurality of marker identifiers generated by the second cluster for messages pending verification at the second cluster; and
requesting that the third cluster provide one or more messages of the subset of messages to the second cluster in response to detecting the synchronization issue.

18. The computer-implemented method of claim 17, wherein generating the first plurality of marker identifiers comprises:
defining the first plurality of marker identifiers based on one or more of a hash or a checksum of each message in the subset of messages in an order that matches the ordering of the subset of messages in the message sequence window.

19. The computer-implemented method of claim 18, wherein requesting that the third cluster provide the one or more messages comprises:
requesting one or more identifiers from the first plurality of marker identifiers that are missing from the second plurality of marker identifiers, wherein the one or more identifiers identify the one or more messages.

20. The computer-implemented method of claim 1, further comprising:
generating a first plurality of marker identifiers that uniquely identify each message in the subset of messages and the ordering of the subset of messages in the message sequence window;
distributing the first plurality of marker identifiers from the third cluster to the second cluster;
detecting a synchronization issue between the second cluster and the third cluster in response to the first plurality of marker identifiers being mismatched with a second plurality of marker identifiers generated by the second cluster for messages pending verification at the second cluster; and
restoring a previous state of the encrypted session by causing the plurality of endpoints to synchronize the encrypted session based on a previous set of messages verified that were verified across the plurality of clusters.

* * * * *